United States Patent [19]
DeMoney

[11] Patent Number: 6,065,050
[45] Date of Patent: May 16, 2000

[54] SYSTEM AND METHOD FOR INDEXING BETWEEN TRICK PLAY AND NORMAL PLAY VIDEO STREAMS IN A VIDEO DELIVERY SYSTEM

[75] Inventor: Michael A. DeMoney, Los Gatos, Calif.

[73] Assignee: Sun Microsystems, Inc., Palo Alto, Calif.

[21] Appl. No.: 08/665,267

[22] Filed: Jun. 5, 1996

[51] Int. Cl.[7] .................................................. H04N 7/10
[52] U.S. Cl. .............................. 709/219; 348/7; 348/12; 455/4.2
[58] Field of Search .................... 455/4.2, 5.9; 348/7, 348/12, 13, 423; 395/200.49, 200.48, 200.47; 360/72.2; 386/68, 81, 82, 111, 112, 95, 98, 124, 125; 370/522; 709/219

[56] References Cited

U.S. PATENT DOCUMENTS

| | | | |
|---|---|---|---|
| 5,479,303 | 12/1995 | Suzuki et al. | 360/72.2 |
| 5,528,282 | 6/1996 | Voeten et al. | 347/7 |
| 5,606,359 | 2/1997 | Youden et al. | 348/7 |
| 5,687,275 | 11/1997 | Lane et al. | 386/68 |

OTHER PUBLICATIONS

John Shelton, et al., Media Server Content Preparation Specification and Default Parameters:, Hewlett Packard, May 4, 1995, pp. 1–22.

*Primary Examiner*—Andrew I. Faile
*Assistant Examiner*—Uyen Le
*Attorney, Agent, or Firm*—Conley, Rose & Tayon, P.C.; B. Noel Kivlin; Mark L. Berrier

[57] ABSTRACT

A system and method for indexing between video streams in an interactive video delivery system. The interactive video delivery system includes at least one media server which stores video streams having different presentation rates. In one embodiment, the system stores a normal play stream and one or more corresponding trick play streams. The trick play video streams are fast forward and/or fast reverse video streams. The system generates index tables or look-up tables between the normal play and trick play video streams which enable indexing between the streams, and uses these look-up tables to switch back and forth between the streams. In creating the index tables, the system first analyzes the normal play stream and creates a normal play time standard based on presentation timestamps from the normal play stream. The system then creates an index table or look-up table for each of the normal play and trick play video streams using the normal play time standard. Each index table includes an array of two-tuples, wherein the two-tuples are the normal play time standard and an index or offset into the respective stream. The index tables enable indexing between the streams. During video delivery, the system uses the respective index tables to switch back and forth between the normal play and trick play video streams.

35 Claims, 6 Drawing Sheets

| MPEG Fast Reverse Stream | |
|---|---|
| Normal Play Time | File Offset |
| 0 | Length of FR File |
| 10 min | |
| Length of Movie | 0 |

| MPEG Fast Forward Stream | |
|---|---|
| Normal Play Time | File Offset |
| 0 | 0 |
| 10 min | |
| Length of Movie | Length of FF File |

| MPEG Normal Play Stream | |
|---|---|
| Normal Play Time | File Offset |
| 0 | 0 |
| 10 min | |
| Length of Movie | Length of Normal Play File |

FIG. 5

SYSTEM AND METHOD FOR INDEXING BETWEEN TRICK PLAY AND NORMAL PLAY VIDEO STREAMS IN A VIDEO DELIVERY SYSTEM

Incorporation by Reference

The following references are hereby incorporated by reference.

The ISO/IEC MPEG specification referred to as ISO/IEC 13818 is hereby incorporated by reference in its entirety.

BACKGROUND OF THE INVENTION

1. Field of the Invention

The present invention relates generally to video delivery and video-on-demand systems, and more particularly to a video server system and method for indexing between video streams having different presentation rates, i.e., normal play, fast forward and fast reverse video streams.

2. Description of the Related Art

Video-on-demand or video delivery systems enable a plurality of users or viewers to selectively watch movies or other audio/video sequences which are stored on one or more video servers or media servers. The video servers are connected through data transfer channels, such as a broadcast cable system or satellite broadcast system, to the plurality of users or subscribers. The video servers store a plurality of movies or other audio/video sequences, and each user can select one or more movies from the video servers for viewing. Each user includes a television or other viewing device, as well as associated decoding logic, for selecting and viewing desired movies. When a user selects a movie, the selected movie is transferred on one of the data transfer channels to the television of the respective user.

Full-motion digital video requires a large amount of storage and data transfer bandwidth. Thus, video-on-demand systems use various types of video compression algorithms to reduce the amount of necessary storage and data transfer bandwidth. In general, different video compression methods exist for still graphic images and for full-motion video. Video compression methods for still graphic images or single video frames are referred to as intraframe compression methods, and compression methods for motion video are referred to as interframe compression methods.

Examples of video data compression for still graphic images are RLE (Run-Length Encoding) and JPEG (Joint Photographic Experts Group) compression. The RLE compression method operates by testing for duplicated pixels in a single line of the bit map and storing the number of consecutive duplicate pixels rather than the data for the pixel itself. JPEG compression is a group of related standards that provide either lossless (no image quality degradation) or lossy (imperceptible to severe degradation) compression types. Although JPEG compression was originally designed for the compression of still images rather than video, JPEG compression is used in some motion video applications.

In contrast to compression algorithms for still images, most video compression algorithms are designed to compress full motion video. Video compression algorithms for motion video use a concept referred to as interframe compression, which involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe compression technique described above. MPEG compression uses both motion compensation and discrete cosine transform (DCT) processes and can yield compression ratios of more than 200:1.

The MPEG standard requires that sound be recorded simultaneously with the video data, and the video and audio data are interleaved in a single file to attempt to maintain the video and audio synchronized during playback. The audio data is typically compressed as well, and the MPEG standard specifies an audio compression method such as MPEG Layer II, also known by the Philips trade name of "MUSI-CAM".

An MPEG stream includes three types of pictures, referred to as the Intra (I) frame, the Predicted (P) frame, and the Bi-directional Interpolated (B) frame. The I or Intra frames contain the video data for the entire frame of video and are typically placed every 10 to 15 frames. Intra frames provide entry points into the file for random access, and are generally only moderately compressed. Predicted frames are encoded with reference to a past frame, i.e., a prior Intra frame or Predicted frame. Thus P frames only include changes relative to prior I or P frames. In general, Predicted frames receive a fairly high amount of compression and are used as references for future Predicted frames. Thus, both I and P frames are used as references for subsequent frames. Bidirectional pictures include the greatest amount of compression and require both a past and a future reference in order to be encoded. Bi-directional frames are not used for references for other frames.

After the I frames have been created, the MPEG encoder divides each I frame into a grid of a suitable size, e.g., 16×16 pixel squares, called macro blocks. The respective I frame is divided into macro blocks in order to perform motion compensation. Each of the subsequent pictures after the I frame are also divided into these same macro blocks. The encoder then searches for an exact, or near exact, match between the reference picture macro block and those in succeeding pictures. When a match is found, the encoder transmits a vector movement code or motion vector. The vector movement code or motion vector only includes information on the difference between the reference frame and the respective succeeding picture. The blocks in succeeding pictures that have no change relative to the block in the reference picture or frame are ignored. In general, for the frame(s) following a reference frame, i.e., P and B frames that follow a reference I or P frame, only small portions of these frames are different from the corresponding portions of the respective reference frame. Thus, for these frames, only the differences are captured, compressed and stored. Thus the amount of data that is actually stored for these frames is significantly reduced.

After motion vectors have been generated, the encoder then tracks the changes using spatial redundancy. Thus, after finding the changes in location of the macro blocks, the MPEG algorithm further reduces the data by describing the difference between corresponding macro blocks. This is accomplished through a math process referred to as the discrete cosine transform or DCT. This process divides the macro block into a suitable number of sub blocks, e.g., four sub blocks, seeking out changes in color and brightness. Human perception is more sensitive to brightness changes than color changes. Thus the MPEG algorithm devotes more effort to reducing color space rather than brightness.

Each picture or frame also includes a picture header which identifies the frame and includes information for that frame. The MPEG standard also includes sequence headers which identify the start of a video sequence. Sequence headers are only required once before the beginning of a video sequence. However, the MPEG-2 standard allows a sequence header to be transferred before any I frame or P frame. The sequence header includes information relevant to the video sequence, including the frame rate and picture size, among other information. MPEG video streams used in digital television applications generally include a sequence header before every I frame and P frame. This is necessary to facilitate channel surfing between different video channels, which is an important user requirement. In general, when a user switches to a new channel, the video for the new channel cannot be displayed until the next sequence header appears in the stream. This is because the sequence header includes important information about the video sequence which is required by the decoder before the sequence can be displayed. If a sequence header were not included before each I frame and/or P frame, then when the user switched to a new channel, the video for the new channel possibly could not be immediately displayed, i.e., the video could not be displayed until the next sequence header.

The sequence headers in an MPEG encoded stream include presentation timestamps or a time base within the encoded stream. Timestamps provide a user with a time reference relative to the beginning of a movie, enabling the user to accurately select or identify a sequence located midstream of the movie without having to reference the beginning of the movie.

Trick Play Streams

In an interactive video-on-demand (VOD) or near-video-on-demand (NVOD) system, it is greatly desirable for the user to be able to selectively fast forward and/or fast reverse through the movie being watched. Thus, some video-on-demand systems include fast forward and fast reverse streams, referred to as trick play streams, for each movie. When the user desires to fast forward or fast reverse through a movie, the user selects the fast forward or fast reverse option. The respective fast forward or fast reverse trick play stream is then transferred to the user at the appropriate point where the user was watching, instead of the normal play stream, thus simulating a fast forward or fast reverse of the movie being watched. Typically, a single video stream, such as a movie, is encoded at different presentation rates to enable the video file to operate in fast forward or fast reverse speed in addition to the normal play presentation rate.

Indexing

Interactive video-on-demand systems which include trick play streams require methods for indexing between the normal play stream and the trick play streams, as well as for indexing between the trick play streams. In other words, when a user is watching a movie and chooses to fast forward for a period of time, a mechanism is needed for the video server to switch from the normal play stream to the appropriate point or frame in the fast forward stream. When the user then desires to resume watching at normal play speed, a mechanism is also needed for the video server to switch from the frame being viewed in the fast forward stream to the appropriate point or frame in the normal play stream. Thus the video server must be able to determine the proper positions within video files when a switch occurs in outputting a first video file at a first presentation rate to a second video file at a second presentation rate.

One approach for indexing between normal play and trick play streams includes using lookup tables to index between the various streams. The look-up tables each include a plurality of indices which reference respective positions or I frames in the various streams. For example, index look-up tables can be generated using the MPEG presentation timestamps from the sequence headers of the normal play stream.

One drawback to this approach is that the MPEG presentation timestamps may not always be continuous. For example, there is no requirement that the MPEG presentation timestamps be continuous, e.g., there could be breaks or gaps in the presentation timestamps.

Another problem is that presentation timestamps are presentation-based. Thus, when a fast forward stream which is 5× fast is being played, the presentation timestamps do not advance 5× faster, but advance at the same rate as they do in a normal play stream. Thus in this method the server is required to perform computations on the presentation timestamps to determine the corresponding place in another stream. This increases the real-time processing burdens on the media server.

This approach also requires each decoder to have intelligence, and further requires the media server to interact with the decoder to accomplish stream switches. For example, when the user selects the fast forward or fast reverse option, in this method the decoder is required to provide information back to the media server of the respective presentation timestamp where the decoder stopped playing, as well as the presentation rate of the stream being played. The media server then uses this information to determine the appropriate presentation timestamp location to begin playing in the new stream. This requirement that the decoder interact with the media server to accomplish stream switches, as well as the computations required to be performed by the media server, increases the overhead of the system. The interaction between the media server and the decoder also requires that each decoder have intelligence, which increases the cost of each decoder.

One such approach based on MPEG presentation timestamps is HP's "PictureNumber, PresentationTimeStamp, FileOffset" format for each table entry. Unfortunately, not all encoding formats are MPEG-based. Further, accurate mapping between presentation rates can be accomplished only if the underlying assumption that the presentation rate is a constant ratio, i.e. one assumes the encoded video stream has a uniform frame rate, is true. Conversely, a uniform frame rate at all presentation rates disables techniques such as "scene fast forward".

Therefore, an improved system and method is desired for efficiently indexing between normal play streams and trick play video streams in a video delivery system. An improved system and method is further desired which reduces the processing burdens of the media server.

SUMMARY OF THE INVENTION

The present invention comprises a system and method for indexing between related video streams in an interactive video delivery system. The interactive video delivery system preferably comprises at least one media server which stores video streams having different presentation rates. In the preferred embodiment, the system stores a normal play stream and one or more corresponding trick play streams. The trick play video streams are fast forward and/or fast reverse video streams. The present invention generates index look-up tables (ILUTs) between the normal play and trick play video streams which enable indexing between the streams, and the present invention uses these ILUTs to switch back and forth between the streams.

In the preferred embodiment, the media server stores normal play video streams which are preferably compressed using any of various types of video compression methods, preferably an MPEG method. In creating the ILUTs, the system first analyzes the normal play stream and creates a normal play time standard based on presentation timestamps comprised in the normal play stream. The system then preferably creates an index look-up table for each of the normal play and trick play video streams using the normal play time standard. Each index table comprises an array of two-tuples, wherein the two-tuples are the normal play time standard and an index or offset into the respective stream. The index tables enable indexing between the streams.

During video delivery, the system of the present invention uses the respective index tables to switch back and forth between the normal play and trick play video streams. For example, when a user is viewing the normal play stream and desires to fast forward through the video stream, the media server examines the current normal play time and offset of the normal play stream being output in order to halt the normal play stream at an appropriate point. The media server also uses the current normal play time to retrieve the appropriate offset in the fast forward stream index table. This offset is then used to begin play of the fast forward stream at the appropriate point or frame when the normal play stream is halted. When the user discontinues fast forwarding and selects normal play, the media server examines the current normal play time and offset of the fast forward stream being output to halt the fast forward stream at an appropriate point. The media server also uses the current normal play time of the fast forward stream to retrieve the appropriate offset in the normal play stream index table. This offset is then used to begin play of the normal play stream at the location where the first forward stream was halted. Similar operations occur when the user fast reverses through the video stream. The present invention also provides a smooth transition between streams having different presentation rates by ensuring that stoppage and initiation of output of the different streams, i.e., switching the output between the different streams, only occurs at well defined "random access" points.

Therefore, the present invention efficiently allows indexing between normal play and trick play streams. The present invention creates a normal play time standard which is used as a common reference, thus simplifying the indexing process. This eliminates the requirement of any intelligence in the decoder and reduces the processing requirements of the video server.

DESCRIPTION OF THE DRAWINGS

A better understanding of the present invention can be obtained when the following detailed description of the preferred embodiment is considered in conjunction with the following drawings, in which:

FIG. 5 illustrates index look-up tables for normal play and trick play streams according to the present invention.

DESCRIPTION OF THE PREFERRED EMBODIMENT

Video Delivery System

Figure 1:
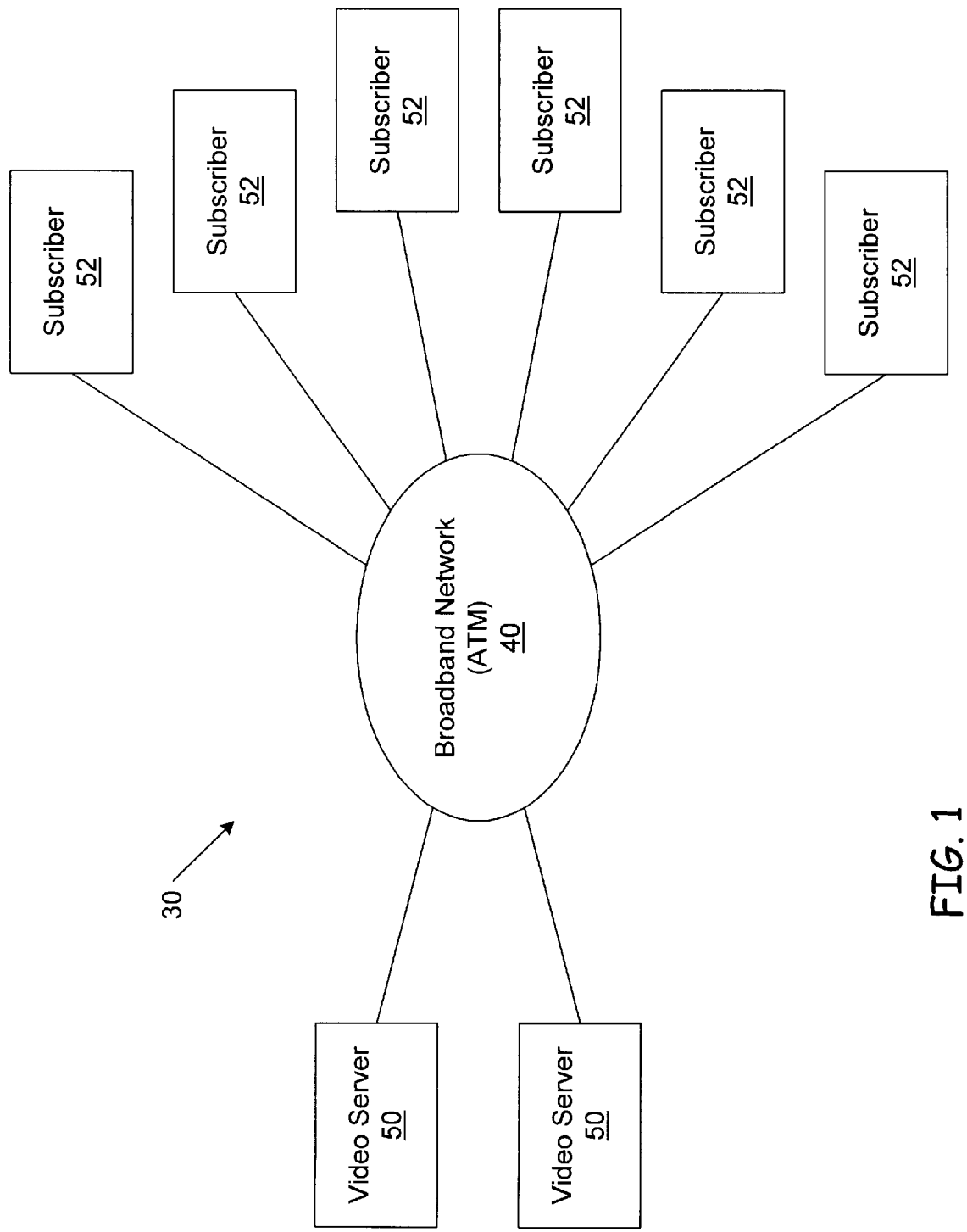
FIG. 1 illustrates a video delivery system including one or more media servers and one or more subscribers.

Referring now to FIG. 1, a video server or video delivery system 30 for storing and transferring video streams is shown. The system 30 is preferably a video-on-demand (VOD) or near-video-on-demand (NVOD) system, or other type of video delivery system, which is capable of transferring or playing video or multimedia streams to one or more users, preferably a plurality of users. In the present disclosure, the term "video stream" is used to refer to a file or sequence of data for presenting a video display. The term "video stream" also includes a multimedia stream which includes both video and audio components.

Figure 2:
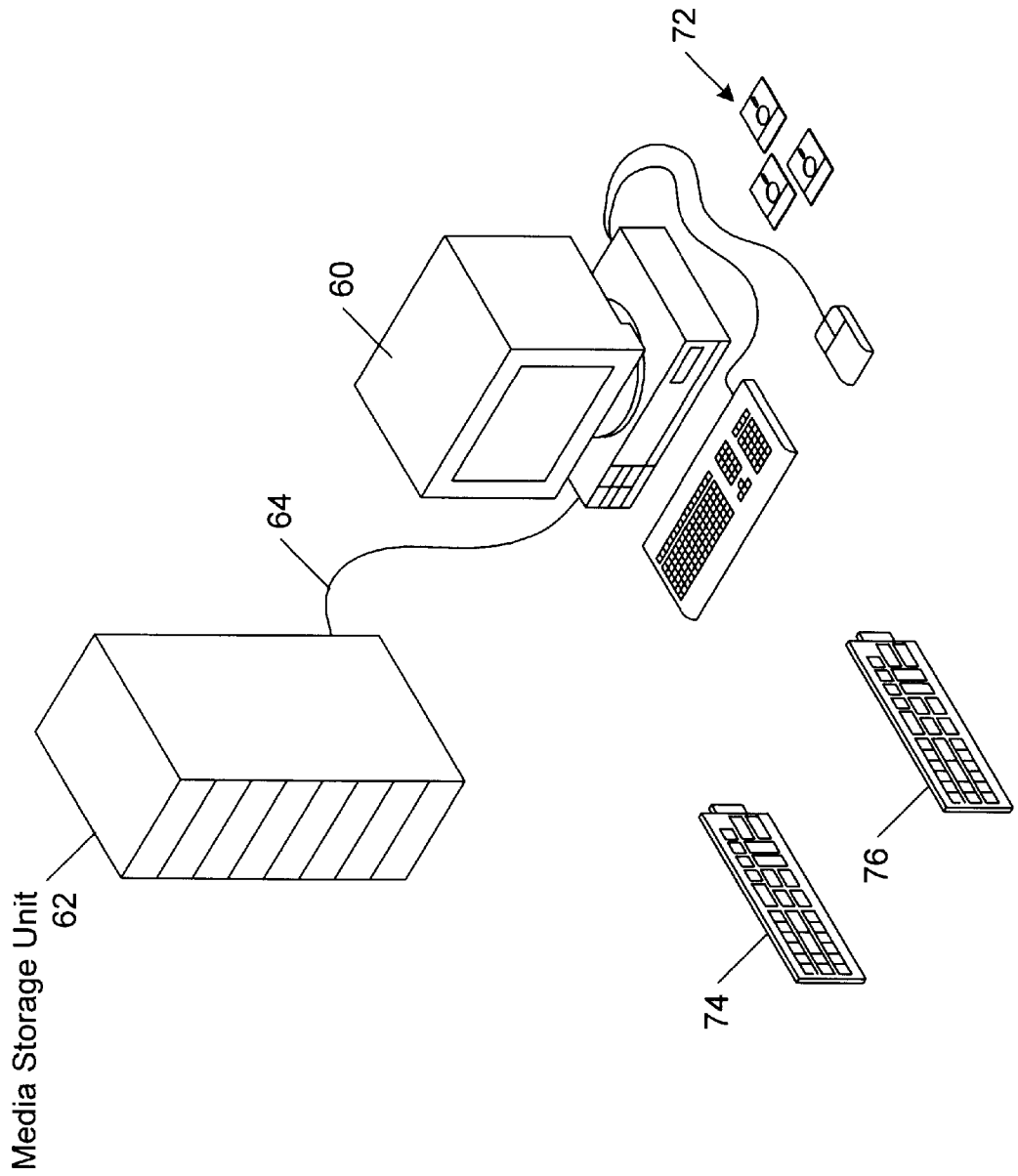
FIG. 2 illustrates the media server of FIG. 1.

As shown, in one embodiment the video delivery system 30 comprises one or more media servers or video servers 50 connected through a broadband network 40 to a plurality of subscribers 52. As discussed below, each media server 50 preferably includes a general purpose computer system 60 (FIG. 2). The broadband network 40 is preferably a network suitable for multimedia content, such as an ATM (Asynchronous Transfer Mode) network. The subscribers 52 preferably include display devices such as televisions, computers, etc.

The media server 50 is capable of transferring or playing video or multimedia streams having different presentation rates. In the preferred embodiment, the system 50 is capable of transferring or playing either a normal play stream or one or more trick play streams. The trick play streams may comprise one or more of a fast forward and/or fast reverse stream. Thus, in the present disclosure, the term "trick play streams" refers to fast forward and/or fast reverse video streams, preferably compressed streams, which are generated from a normal play stream, and which have a different presentation rate than the normal play stream.

As noted above, the normal play and trick play streams are preferably compressed video streams. The present invention operates independently of the type or format of the video streams. Thus the video streams may be compressed in any of various types of formats, including MPEG-1, MPEG-2, Motion JPEG, QuickTime, etc. Further, the present invention operates independently of the frame rate and other presentation characteristics.

FIG. 2—Media Server

Figure 3:
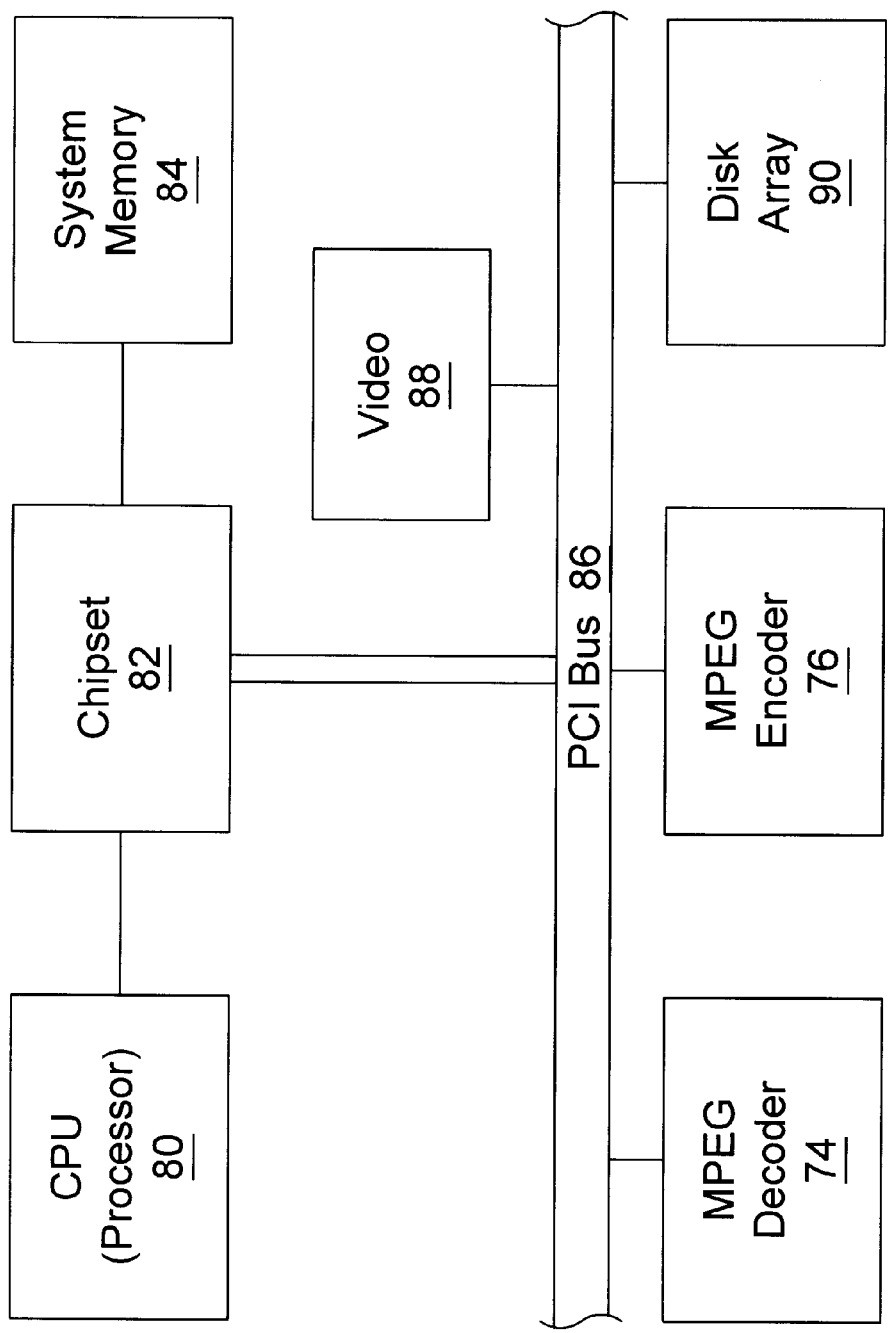
FIG. 3 is a block diagram illustrating the media server computer system of FIG. 2.

Referring now to FIG. 2, in this embodiment the media server or video server 50 comprises a computer system 60. FIG. 3 is a block diagram illustrating the components comprised in the media server computer system 60 of FIG. 2. The media server computer system 60 includes various standard components, including one or more processors, one or more buses, a hard drive and memory. It is noted that FIG. 3 is illustrative only, and other computer architectures may be used, as desired. As shown, the computer system 60 includes at least one processor 80 coupled through chipset logic 82 to a system memory 84. The chipset 82 includes a PCI (Peripheral Component Interconnect) bridge for interfacing to PCI bus 86. The computer system 60 includes a RAID (Redundant Array of Inexpensive Disks) disk array 90 or other storage media for storing the normal play streams and corresponding trick play streams. The computer system 60 may include either or both of an MPEG decoder 74 and MPEG encoder 76, which are shown connected to PCI bus 86. The computer system 60 may also include video circuitry 88, as shown.

Referring again to FIG. 2, the computer system 60 includes or is coupled to one or more digital storage or media storage devices. For example, in the embodiment of FIG. 2 the computer system 60 couples to a media storage unit 62 through cable 64. The media storage unit 62 may be in addition to, or instead of, a disk storage system in the computer system 60. The media storage unit 62 includes one or more composite RAID drives for storing the normal play streams and corresponding trick play streams. Alternatively, the media storage unit 62 may instead include one or more CD-ROM drives and/or one or more Digital Video Disk (DVD) storage units, or other types of media, for storing digital video. The computer system 60 may also include one or more internal CD-ROM drives or may couple to one or more separate Digital Video Disk (DVD) storage units. The computer system 60 also may connect to other types of digital or analog storage devices, as desired.

The compressed normal play and trick play streams may be comprised on a storage media in the media server 50, such as a RAID disk array, CD-ROM or Digital Video Disk (DVD). The media server 50 reads the respective normal play or trick play stream from the storage media and provides the data out to the one or more display units or viewers (subscribers) 52. The media server 50 may output the video data using various communication media, such as ATM (Asynchronous Transfer Mode), ISDN (Integrated Services Digital Network), or via satellite. As noted above, the subscriber display units may comprise televisions, computer systems or other systems with a display screen for displaying video content.

As mentioned above, media server 50 indexes or switches between normal play and trick play video streams, generally based on user selections. As discussed further below, the media server 50 generates index tables for the various streams and uses these tables to switch between the various streams. In this embodiment, the index table generation and indexing functions are performed by the media server 50 in software, wherein the software is represented by floppy disks 72. In another embodiment, the computer system 60 includes dedicated hardware which performs one or both of the index table generation and indexing functions.

It is noted that the media server 50 may comprise two or more interconnected computers, as desired. It is noted that any of various types of video delivery systems may be used according to the present invention, as desired.

Figure 4:
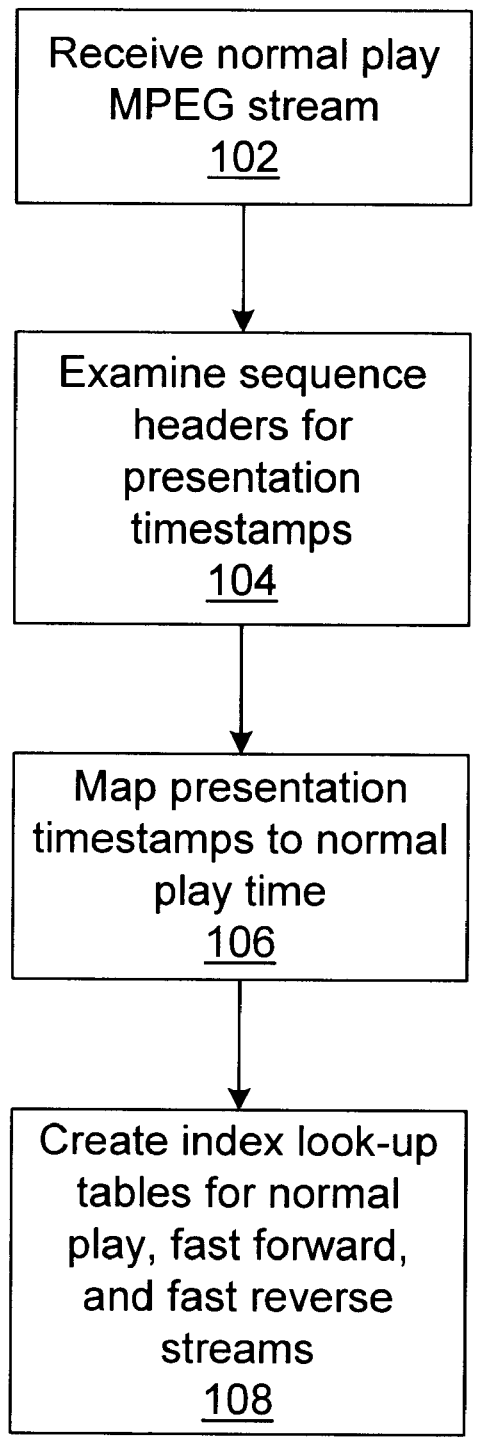
FIG. 4 is a flowchart diagram illustrating generation of index look-up tables for normal play and trick play streams according to the present invention.

FIG. 4—Creation of Index Look-up Tables

Referring now to FIG. 4, a diagram illustrating generation of index look-up tables (LUTs) according to the present invention is shown. Here it is presumed that a normal play stream and one or more trick play streams are stored in the system. The different streams preferably encode the same content for presentation at different rates.

As shown in step 102, server 50 receives or examines a normal play video stream or multimedia stream. As discussed above, the normal play stream comprises a stream of video data which is used to present a video sequence, such as a television segment or movie, onto a screen, such as a television or a computer system. In this embodiment, the normal play stream is a compressed stream, preferably an MPEG-2 compressed stream, although other types of compression may be used, as desired. Accordingly, the index LUTs are generated using the existing MPEG-encoded video stream.

In step 104, server 50 analyzes timestamps within the stream. In this embodiment where the stream is an MPEG stream, the system analyzes the presentation timestamps from the sequence headers in the stream. As mentioned above, the presentation timestamps are used to provide a time base for the video sequence.

As discussed above, an MPEG encoded stream includes a plurality of I frames which are intracoded pictures, and a plurality of B and P frames which are intercoded frames. The I frames each contain video data for an entire frame of video and are placed periodically in the sequence. The P and B frames include change information relative to prior or subsequent frames. Each picture or frame also includes a picture header which identifies the frame and includes information for that frame. An MPEG encoded stream further includes one or more sequence headers which include certain information regarding the video sequence, including the frame rate and the picture size, among other information. The sequence headers include presentation timestamps which indicate the play time of the video sequence.

In step 106 server 50 maps the presentation timestamps to a "normal play time" (NPT) standard. Thus server 50 defines a multimedia index based on the concept of NPT that can be associated with a "position" within a multimedia title. Positions are defined to be equivalent between multimedia or video streams having different presentation rates when the content present -at the respective position is conceptually substantially equivalent. Hence, for video data, the position is defined to be equivalent when the same or substantially the same image in the sequence is being presented, allowing for differences in resolution and other encoding parameters than may be particular to the stream.

In accordance with the present invention, NPT provides an indication of contextual position within a compressed video stream, or any other multimedia file, by assigning an increasing numeric value to succeeding elements, e.g., frames or sequences, in the stream. As a result, NPT permits the location of a particular item of content within the video stream to be determined regardless of the presentation rate, encoding scheme or storage medium.

In generating the normal play time standard, server 50 examines the presentation timestamps and keeps track of the original or base presentation timestamp at the beginning of the movie. Server 50 then subtracts that base or original presentation timestamp from subsequent timestamps to determine the normal play time values for the normal play stream, thereby compensating for any non-zero base presentation timestamp. In other words, in order to calculate normal play time for a given point in the normal play stream, the system subtracts the base presentation timestamp from a future presentation timestamp at the respective point or location in the normal play stream to determine the normal play time value for that location.

In this embodiment, the normal play time (NPT) for a position in a multimedia stream is the time from the beginning of the title until the respective position when measured by presentation of the normal speed forward or normal play stream. Therefore, the present invention uses the concept of normal play time. Normal play time corresponds to the speed of the normal play stream and has a one to one correspondence with clock time. Thus, every second the normal play movie ticks forward, normal play time clicks forward one second. In a fast forward file or fast forward trick play stream, if the FF stream is 5× faster, normal play time is 5× faster as the user is watching.

In general, any particular scene in the movie is identified by a normal play time. Thus, if a particular scene occurs at X minutes into the movie in normal play time, then this position or scene is referred to as or called X minutes. This particular scene is also located in any of the other trick play streams at X minutes normal play time. Thus in the fast forward and fast reverse streams, even though time is going by much faster, at X minutes normal play time the particular scene occurs.

In step 108 server 50 creates an index look-up tables for each of the multimedia streams, i.e., for the normal play stream and each of the trick play streams. The index look-up table for the normal play multimedia stream comprises an index or array of two-tuples. The index look-up tables for a normal play, fast forward, and fast reverse stream are shown in FIG. 5. As shown, each tuple comprises a normal play time value and a corresponding file offset within the stream.

Note that the entries in each NPT index may be constrained by requirements of the encoding scheme. For example, some encoding schemes may only allow random positioning into the encoded stream at certain non-linear intervals. In the case of an MPEG2 transport stream, the "random access indicator" is set within the transport packet header to indicate the file offsets of the respective encoded data packets and resulting NPT indices are "randomly accessible".

For the normal play stream, the normal play time entries comprise the normal play time values computed in step 106. For the scaled streams, e.g., the fast forward and fast reverse streams, a scale factor is introduced into the normal play time values of the index look-up tables to compensate for the different presentation rates. Scaling of the presentation timestamps can be accomplished by multiplying the compressed presentation timestamp value by the ratio of the presentation rate to the normal presentation rate.

It is noted that equivalent positions in multimedia streams having different presentation rates will have equal NPT values, although the actual time presentation from the beginning of the stream to that position will differ for the different streams. It is also noted that equivalent positions in multimedia streams having different presentation rates, although having equal NPT values, will have different byte offsets due to a presumptive difference in length of the streams having different presentation rates.

The index look-up tables specify indices or entries each based on a normal play time and a file offset to allow the multimedia server 50 to initiate or stop play at a particular normal play time point in the multimedia stream. The index look-up table indices also allow the multimedia server 50 to transfer to and between equivalent positions between streams of different presentation rate, i.e., between normal play and trick play streams. The index look-up table only includes tuples representing valid positions for starting, stopping, or transferring between the streams.

The creation of the look-up tables is independent of any particular type of video compression or MPEG representation. Hence, where MPEG compression is used, the index lookup tables are created by scanning through the MPEG file, noting random access points in the MPEG file to compensate for presentation timestamp discontinuities, and then converting from the -presentation timestamp in the MPEG file into the normal play time standard. Conceptually, each index table comprises an array of normal play time vs. scenes, and any particular image in the movie can be identified by the normal play time value. As noted above, an index table is created for each presentation rate, e.g., fast forward, fast reverse, and normal play. Each of the offsets stored in the index table is an index from the normal play time to a byte offset in that MPEG file where the particular scene begins.

Hence, server 50 uses a normal play time standard, instead of using timestamps in the video stream. As noted above, there is no requirement that the timestamps be continuous, e.g., there could be breaks or gaps in the presentation timestamps. Therefore, unlike prior art methods, the system of the present invention does not use the presentation timestamps as a basis for creating the index tables. Instead, the system of the present invention maps the presentation timestamps to a normal play time standard, and this normal play time standard is then used as a basis for creating the index tables.

Figure 6:
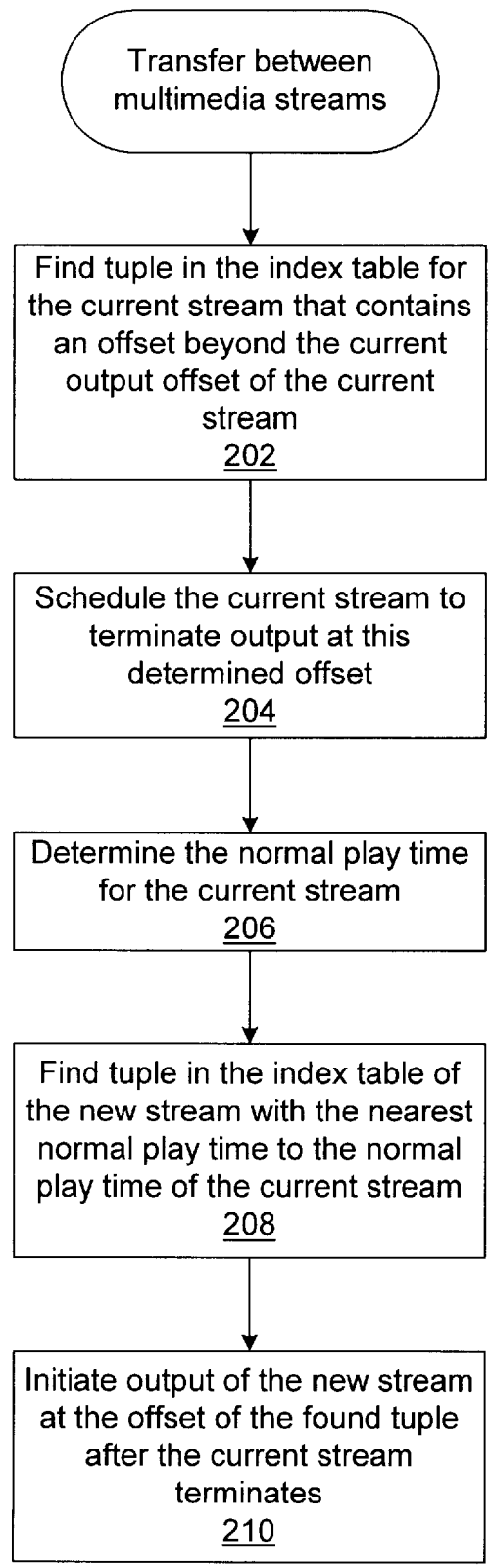
FIG. 6 is a flowchart diagram illustrating operation of the media server indexing between a normal play and trick play streams according to the present invention.

FIG. 6—Transferring Between Streams

Referring now to FIG. 6, a flowchart diagram illustrating operation of the system of the present invention transferring outputs between multimedia streams having different presentation rates is shown. Here it is assumed that a current video or multimedia stream is being output from the media server 50, and the media server 50 has received user input indicating that a different stream should be output. For example, the media server may be providing the normal play multimedia stream, and the media server 50 receives user input of a fast forward or fast reverse selection, indicating that either the fast forward or fast reverse trick play stream should be output at the appropriate point.

When user input is received indicating a desired change in the presentation rate, then in step 202 the media server 50 finds a tuple in the index table of the current stream or file that contains an offset beyond the current output offset. In other words, assuming that the current stream is playing and is at a certain point or offset within the stream, in step 202 the media server 50 finds the tuple or entry in the index table of the current stream that contains an offset that is at or just beyond the current output offset. The current output offset is preferably provided by media file system (MPS) software executing in the media server 50. In step 202 the media server 50 receives this byte offset of the current output of the stream and searches the index table for the nearest offset greater than or equal to the byte offset of the current output of the stream.

In step 204 the media server 50 schedules the current stream to terminate output at this offset determined in step 202. Thus, in order to terminate a current stream being output, the media server 50 preferably finds the tuple for the nearest subsequent normal play time or nearest offset of the location currently being played and utilizes the associated offset of this type to terminate play of the current video stream at this offset.

In step 206 the media server 50 determines the normal play time for the current stream. It is noted that the normal play time for the current stream may have been previously determined in step 202. In other words, having determined the nearest offset greater than the byte offset of the current output stream in step 202, the corresponding normal play time value in this tuple may be used as the normal play time for the current stream.

In step 208 media server 50 finds the tuple in the index table of the new stream, i.e., the stream to be output, with the nearest normal play time to the normal play time of the current stream. In step 210 the media server 50 uses the offset of the found tuple in step 208 to initiate output of the new stream at that offset. The output of the new stream is preferably initiated after the current stream terminates, wherein the current stream is scheduled to terminate in step 204 as described above.

Therefore, initiation and termination of the output of a respective stream being output at a given normal play time is accomplished by finding the tuple in the respective index table for the nearest normal play time and utilizing the associated file offset as the point to initiate or terminate play of the stream. Transferring between different multimedia data streams having different presentation rates is accomplished by utilizing entries in each of the respective tables of the current stream and the new stream to be played to reschedule termination of output of the current stream and the beginning of play of the new stream.

In sum, the present invention comprises a system and method for indexing between normal play and trick play video streams. The present invention examines the presentation timestamps in the sequence headers of the normal play stream and creates a normal play time standard which is used for all streams. The system then creates index tables or look-up tables for the stream. The index tables for the streams comprise normal play time values and corresponding offsets into the respective stream. During play, the video delivery system uses these index tables to intelligently jump or index between the normal play and trick play streams. This approach also permits non-constant presentation rates such as scene forward or presentation rates based on content complexity.

Other modifications may be used to generate a normal play time standard for the normal play stream without departing from the present invention. For example, NPT index LUTs can also be generated prior to encoding of the video streams by using frame numbers or sequence numbers. Alternatively, the NPT indices may be generated concurrently with the video content encoding. In either case, NPT indices can be generated by multiplying the frame number by the frame rate. This NPT position can then be associated with the file offset of the encoded frame.

In yet another exemplary embodiment, the video content is encoded at a constant bit rate. Accordingly, NPT entries for some (possibly proper) subset of the random access point specified by the encoded video stream may be generated using the following equations:

For forward presentations (i.e. positive presentation rate scale factor), the NPT value for each file offset at which a Random Access Point occurs may be calculated using the equation:

$$NPT = (PresentationRateScaleFactor * FileBitOffset) / ConstantBitRate$$

Conversely, for reverse presentations (i.e. negative presentation rate scale factor), the NPT value for each file offset may be calculated using the equation:

$$NPT = TotalNPT + ((PresentationRateScaleFactor * FileBitOffset) / ConstantBitRate)$$

Wherein:

PresentationRateScaleFactor=ratio of presentation rate with respect to normal presentation rate (e.g. a value of 7 indicates 7× fast forward, a value of −5 indicates 5× fast reverse);

FileBitOffset=the number of bits from the beginning of the encoding to the file offset specified as a random access point;

ConstantBitRate=the constant bit rate at which the encoding is intended to be played; and TotalNPT=the total time duration of normal speed presentation (i.e. what would be commonly though of as the length of the movie).

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for indexing a first video stream having a first presentation rate and a second video stream having a second presentation rate, the method comprising the steps of: creating an index look-up table (LUT) associated with each of said video streams using a normal play time standard for the associated video stream, wherein each of said index LUTs includes a plurality of entries comprising a normal play time value from the associated video stream and a corresponding offset into the other video stream; and switching between said first video stream and said second video steam using said index LUTs.

2. The method of claim 1, wherein the video streams include a normal play stream, wherein said creating index look-up tables for said first and second video streams includes:

receiving the normal play stream, wherein the normal play stream includes a plurality of timestamps; and mapping said plurality of timestamps to said normal play time standard;

wherein said creating index look-up tables for said first and second video streams uses said normal play time standard.

3. The method of claim 2, wherein said video streams having different presentation rates comprise MPEG compressed streams;

wherein said mapping said plurality of timestamps to a normal play time standard comprises examining sequence headers in said MPEG compressed normal play stream for said plurality of timestamps.

4. The method of claim 1, wherein said video streams include trickplay streams including a fast forward stream and a fast reverse stream.

5. The method of claim 1, wherein said normal play time has a one to one correspondence to clock time.

6. A computer-implemented method for transitioning between a first video stream having a first presentation rate and a second video stream having a second presentation rate, the method comprising:

creating an index look-up table (LUT) associated with each of said video streams using a normal play time standard for the associated video stream, wherein each of said index LUTs includes a plurality of entries comprising a normal play time value from the associated video stream and a corresponding offset into the other stream;

transferring video data from said first video stream to an output of said computer; and switching between said first video stream and said second video stream using said index LUTs.

7. The method of claim 6, wherein the video streams include a normal play stream, wherein said creating index look-up tables for said first and second video streams includes:

receiving the normal play stream, wherein the normal play stream includes a plurality of timestamps; and mapping said plurality of timestamps to said normal play time standard;

wherein said creating index look-up tables for said first and second video streams uses said normal play time standard.

8. The method of claim 7, wherein said video streams comprise MPEG compressed streams;
   wherein said mapping said plurality of timestamps to a normal play time standard comprises examining sequence headers in said MPEG compressed normal play stream for said plurality of timestamps.

9. The method of claim 6, wherein said switching between said first and second streams includes:
   determining the normal play time of said first video stream;
   determining an offset in the second video stream based on the normal play time of the first video stream; and
   initiating output of the second video stream at said determined offset in the second video stream.

10. The method of claim 9, wherein said determining an offset in the second video stream based on the normal play time of the first video stream comprises:
   finding an entry in an index look-up table of said second video stream having a normal play time value close to the normal play time of the first video stream; and
   determining the offset in said found entry in said index look-up table of said second video stream.

11. The method of claim 9, wherein said switching between said first and second video streams further comprises:
   determining an entry in an index table for the first video stream that contains an offset beyond an offset of data currently being output from the second video stream; and
   scheduling output of the current stream to terminate at said offset beyond the offset of data currently being output from the first video stream.

12. The method of claim 6, wherein the video streams having different presentation rates include trickplay streams including a fast forward stream and a fast reverse stream.

13. The method of claim 6, wherein said normal play time has a one to one correspondence to clock time.

14. A computer-implemented method for transitioning between a first video stream having a first presentation rate and a second video stream having a second presentation rate, the method comprising:
   transferring video data from said first video stream to an output of said computer;
   referencing an index look-up table (LUT) for each said video stream, wherein each said LUT is associated with one of said video streams and includes a plurality of entries comprising a normal play time (NPT) value for said associated video stream and a corresponding offset into the other video stream;
   switching from said first video stream to said second stream using the index LUTs; and
   transferring video data from said second video stream to said output of said computer.

15. The method of claim 14, wherein the video streams include a normal play stream, wherein said creating index look-up tables for said first and second video streams includes:
   receiving the normal play stream, wherein the normal play stream includes a plurality of timestamps; and
   mapping said plurality of timestamps to said normal play time standard;
   wherein said creating index look-up tables for said first and second video streams uses said normal play time standard.

16. The method of claim 15, wherein said video streams comprise MPEG compressed streams;
   wherein said mapping said plurality of timestamps to a normal play time standard comprises examining sequence headers in said MPEG compressed normal play stream for said plurality of timestamps.

17. The method of claim 14, wherein said switching between said first and second streams includes:
   determining the normal play time of said first video stream;
   determining an offset in the second video stream based on the normal play time of the first video stream; and
   initiating output of the second video stream at said determined offset in the second video stream.

18. The method of claim 17, wherein said determining an offset in the second video stream based on the normal play time of the first video stream comprises:
   finding an entry in an index look-up table of said second video stream having a normal play time value close to the normal play time of the first video stream; and
   determining the offset in said found entry in said index look-up table of said second video stream.

19. The method of claim 17, wherein said switching between said first and second video streams further comprises:
   determining an entry in an index table for the first video stream that contains an offset beyond an offset of data currently being output from the second video stream; and
   scheduling output of the current stream to terminate at said offset beyond the offset of data currently being output from the first video stream.

20. The method of claim 14, wherein the video streams having different presentation rates include trickplay streams including a fast forward stream and a fast reverse stream.

21. The method of claim 14, wherein said normal play time has a one to one correspondence to clock time.

22. A video server which provides video streams having different presentation rates, wherein the video server indexes between said video streams having different presentation rates, the video server comprising:
   video memory configured to store the video streams having different presentation rates;
   an index look-up table (LUT) associated with each of said video streams, wherein the index look-up tables are based on a normal play time standard, wherein each of said index look-up tables includes a plurality of entries comprising a normal play time value of the associated video stream and a corresponding offset into the other video stream;
   one or more output ports coupled to said video memory for transferring video data from one of said video streams; and
   a switch coupled to said video memory and said memory, and configured to switch between said video streams at said one or more output ports, wherein said switch uses said index look-up tables in switching between said video streams.

23. The video server of claim 22 wherein the video streams include a normal play stream, the video server further configured to create indices for said LUTs by examining the normal play stream which includes a plurality of timestamps and by mapping said plurality of timestamps to said normal play time standard.

24. The video server of claim 23, wherein said mapping of said plurality of timestamps to said normal play time standard is accomplished by examining sequence headers in said MPEG compressed normal play stream for said plurality of timestamps.

25. The video server of claim 22 further configured to determine the normal play time of a current stream being played, to determine an offset in a new stream based on the normal play time of the current stream, and to initiate output of the new stream at said determined offset in the new stream.

26. The video server of claim 25 further configured to locate an entry in an index look-up table of said new stream having a normal play time value close to the normal play time of the current stream, and to determine the offset in said found entry in said index look-up table of said new stream.

27. The video server of claim 25 further configured to determine an entry in an index table for the current stream that contains an offset beyond an offset of data currently being output from the current stream and to schedule output of the current stream to terminate at said offset beyond the offset of data currently being output from the current stream.

28. The video server of claim 22, wherein the video streams having different presentation rates include trickplay streams including a fast forward stream and a fast reverse stream.

29. The video server of claim 22, wherein said normal play time has a one to one correspondence to clock time.

30. A computer-readable storage media for operating in a computer system, the computer system including a central processing unit and memory, wherein the computer system stores video streams having different presentation rates, wherein the computer-readable storage media includes a substrate having a physical configuration representing data, the storage media comprising:

an index look-up table creation program configured to create index look-up tables for each of said video streams, each of said index look-up tables using a normal play time standard, wherein each of said index look-up tables includes a plurality of entries comprising a normal play time value of an associated one of said video streams and a corresponding offset into another of said video streams;

a video stream switching program configured to switch between output of a current one of said video streams and a new one of said streams using said index look-up tables.

31. The computer-readable storage media of claim 30, wherein the video streams include a normal play stream, wherein said index look-up table creation program includes:

an examining program configured to examine the normal play stream, wherein the normal play stream includes a plurality of timestamps; and a mapping program configured to map said plurality of timestamps to said normal play time standard;

wherein said index look-up table creation program uses said normal play time standard.

32. The computer-readable storage media of claim 30, wherein said video stream switching program includes:

a program configured to determine the normal play time of the current stream;

a program configured to determine an offset in the new stream based on the normal play time of the current stream; and a program configured to initiate output of the new stream at said determined offset in the new stream.

33. The computer-readable storage media of claim 32, wherein said program for determining an offset in the new stream based on the normal play time of the current stream comprises:

a program configured to find an entry in an index look-up table of said new stream having a normal play time value close to the normal play time of the current stream; and a program configured to determine the offset in said found entry in said index look-up table of said new stream.

34. The computer-readable storage media of claim 32, wherein said video stream switching program further comprises:

a program configured to determine an entry in an index table for the current stream that contains an offset beyond an offset of data currently being output from the current stream; and a program configured to schedule output of the current stream to terminate at said offset beyond the offset of data currently being output from the current stream.

35. A video subscription system for receiving and displaying video streams having different presentation rates from a video server, wherein the video server indexes between said video streams having different presentation rates, the video subscription system comprising:

a video display device configured to display the video streams having the different presentation rates; and a controller coupled to said video display device and configured to cause said video server to switch between said video streams by using an index look-up table (LUT) for each of said video streams, wherein the index look-up tables are based on a normal play time standard, wherein each of said index look-up tables includes a plurality of entries comprising a normal play time (NPT) value and a corresponding offset into the respective stream, and wherein said video streams include a normal play stream and said entries are created by examining the normal play stream which includes a plurality of timestamps and by mapping said plurality of timestamps to said normal play time standard.

* * * * *